Patented Mar. 6, 1923.

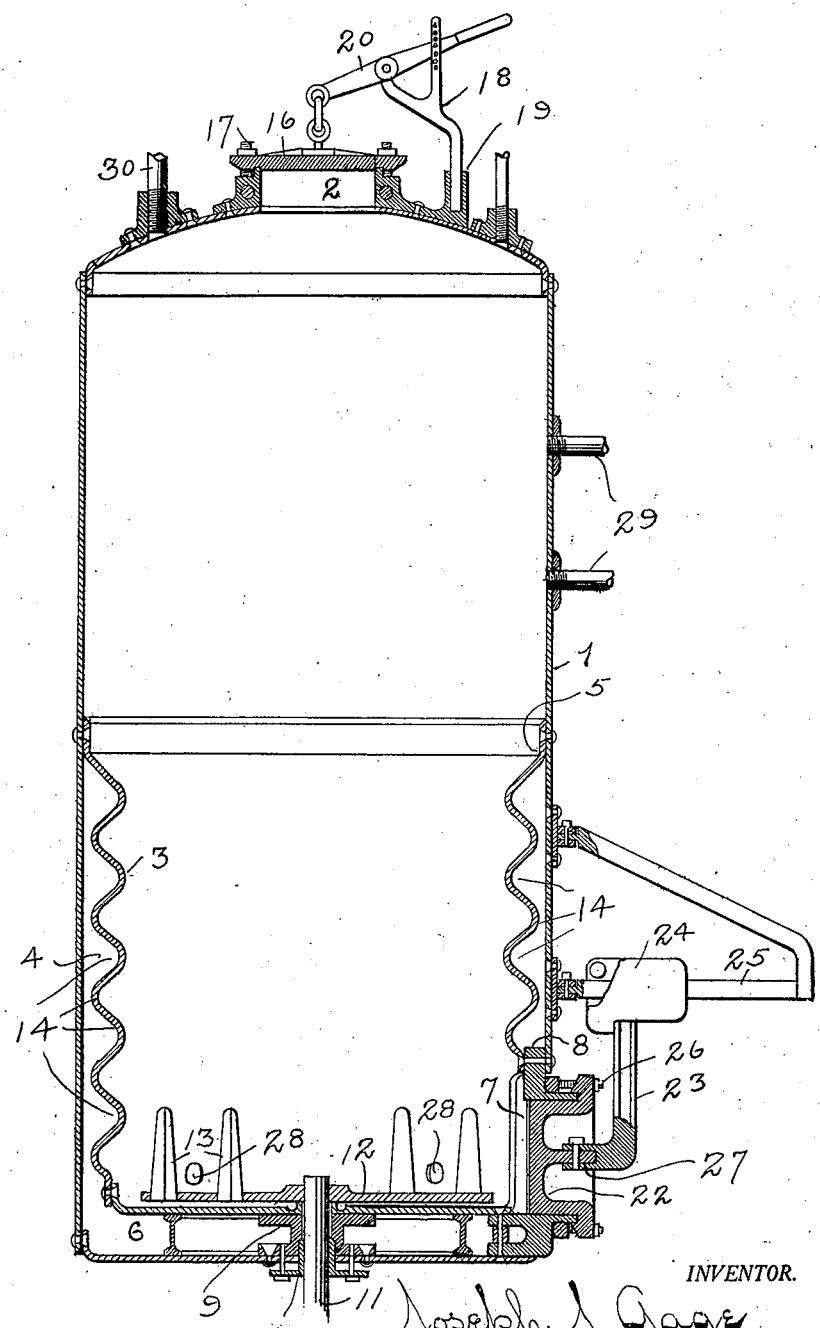

1,447,206

UNITED STATES PATENT OFFICE.

JOSEPH J. GAGE, OF DAYTON, OHIO, ASSIGNOR, BY MESNE ASSIGNMENTS, OF ONE-HALF TO THOMAS CURETON, OF DAYTON, OHIO.

DRIER TANK.

Application filed December 18, 1920. Serial No. 431,680.

*To all whom it may concern:*

Be it known that I, JOSEPH J. GAGE, a citizen of the United States, residing at Dayton, in the county of Montgomery and State of Ohio, have invented certain new and useful Improvements in Drier Tanks, of which the following is a specification.

My invention relates to cooker tanks for butchers and packers, and more particularly to reinforcement means for the inner shell of steam jacketed tanks, used for cooking and drying refuse, offals, and waste material for fertilizer purposes, but also capable of use as a rendering tank.

The object of the invention is to simplify the structure as well as the means and mode of operation of such tanks, whereby they will not only be cheapened in construction, but will be more efficient in use, having greater durability, of increased strength, and subjected to minimum stresses and strains, incident to expansion and contraction.

A further object of the invention is to provide a reinforced inner shell or compartment, which will be free to expand with variations of temperature independent of the outer shell, yet amply reinforced to resist collapsing tendencies under external pressure.

A further object of my invention is to so construct and arrange the parts of such cooker tank as to obviate the necessity of stay bolts, spacers or other reinforcing means connecting the inner and outer shells of the cooker tanks, to prevent the collapse of the inner compartment.

With the above primary and other incidental objects in view as will more fully appear in the specification, the invention consists of the features of construction, the parts and combinations thereof, and the mode of operation or their equivalents as hereinafter described and set forth in the claims.

In the accompanying drawing, which comprises a vertical sectional view of an assembled cooker tank, embodying the present invention, there is illustrated the preferred, but not necessarily the only embodiment of the invention.

In the reduction of refuse and offals, for fertilizer purposes, it is quite the practice to cook such material in a steam jacketed or double boiler, by first introducing the live steam directly into the mass of material, until it is thoroughly cooked, and all grease, fat and oil are liberated. The grease and oil which rises to the top of the cooking mass are drained off thru outlet conduits, and after the mass has been sufficiently cooked, steam is admitted to the intermediate space between the walls of the vessel or boiler, thereby subjecting the cooked mass of material to a drying heat. The mass is continuously agitated during the drying process by a rotary agitator within the inner vessel or compartment. Heretofore considerable difficulty has been experienced thru the tendency of the inner vessel or compartment to collapse under external pressure of the steam within the steam jacket or space between the walls of the inner and outer compartment. It has been customary to provide stay bolts or ties which connect the inner and outer compartments or shells at intervals. However, the inner shell being subject to much greater heat and not subjected to the cooling influence of the surrounding atmosphere, expands and contracts to a greater degree than the exterior shell, thereby setting up stresses and strains, which tend to loosen the stay bolts or ties, thereby causing leakage. Moreover, these strains and stresses tend to warp the walls of the compartments or shells ununiformly, materially shortening the life and durability of such cookers.

The mass of material comprising offals, refuse and waste material to be treated is of more or less acid nature and upon the loosening of the stay bolts in the ordinary construction, this acid attacks the material of the stay bolts and the interengaging screw threads, causing rust and corrosion and materially increasing the looseness and leakage, initiated by the ununiform warping and the strains of the vessel due to expansion and construction.

Referring to the drawing, 1 is a cylindrical shell or boiler having at the upper end a man hole or access opening 2. Within this main outer shell 1, is suspended an inner shell or cooking vessel 3. Such inner shell 3 is of less diameter than the main shell 1, and is positioned concentrically therein in spaced relation with the walls of the main shell 1 to afford intermediate the inner shell 3 and outer shell 1, a surrounding steam space 4. The inner cooking shell 3 is attached to the walls of the shell 1 at a substantially mid height point by being outwardly flanged or expanded, as at 5 and secured by riveting, welding or other suitable means. The connection is at such height that the inner or cooking shell is suspended within the main shell in spaced relation not only with the side walls, but also within the bottom of such main shell, as indicated at 6. At the lower portion of the inner or cooking shell 3 there is provided a man hole 7 formed in a collar or spacer 8 interposed between the inner and outer shells, and sealing the space about such man hole. Centrally disposed in the bottom of the cooker is a head 9, having therein a packing gland 10, thru which extends a revoluble shaft 11 of an agitator rotatable within the cooking tank 3. This agitator comprises radially disposed arms 12 preferably having upturned extensions 13. Aside from the connection of the man hole collar 8 and the bearing head 9 for the agitator shaft, the inner shell 3 is entirely independent of the outer shell 1, below its upper marginal attachment flange. No intermediate ties are interposed between the walls of the inner and outer shell. In lieu thereof the inner shell is peripherally corrugated as at 14 to reinforce the shell and enable it to resist external pressure of the steam within the intervening space between the shell 3 and main shell 1. At the same time, the inner shell being independent of the main shell or devoid of tie bolts or intervening spacers, it is permitted to expand and contract without subjecting either of the shells to undue strains incident to the tying or connections of the respective shells by tie bolts as is the usual construction. Moreover, the peripheral corrugations increase somewhat the wall surface or heating surface to which the contents of the vessel are subjected during the drying operation. Thus by this construction involving the peripheral corrugations of the inner vessel, the drying period is materially reduced and the life of the cooker tank greatly lengthened. This form of reinforcement reduces to a minimum, openings or crevices in the inner walls of the vessel such as rivet holes, studs or stay bolts fastenings, which afford access openings for the acids contained in the material operated upon. Furthermore, the corrugated construction tends to equalize or compensate for expansion and contraction and minimizes the strains incident thereto.

The manhole 2 at the top of the cooker is provided with a closure lid 16 to be secured in position by bolts 17. In order to lift the closure head 16 into and out of registry with the man hole, there is provided a Y-shaped standard revolubly mounted in a socket 19. The closure head 16 is suspended from a lifting lever 20 pivoted to one of the arms of the Y-shaped standard 18. The lifting lever is engageable with the other arm of such Y-shaped standard to maintain the closure head 16 in elevated position.

The man hole 7 at the bottom of the cooker is likewise provided with a removable closure head 22. This closure head is carried upon the end of a dependent arm 23, mounted upon a slide 24, having reciprocatory movement upon a swinging bracket arm 25, hinged to the shell 1. This closure head 22 is likewise secured in adjusted position by swinging bolts 26. Upon releasing the nuts upon the bolts 26 and swinging such bolts aside, the closure head 22 may be withdrawn from the man hole 7, by sliding the support 24 outwardly upon the bracket arm 25, whereupon the bracket arm may be oscillated laterally upon its hinged connection 27, to shift the closure head 22 out of registry with man hole 7. For convenience, the closure head 22 is preferably hinged or pivoted to the lower end of the dependent supporting arm 23.

A steam inlet 28 is provided adjacent to the bottom of the inner shell thru which steam is admitted during the cooking process. Likewise outlets 29 are provided at different levels thru which may be drawn off the grease and oil released from the mass of material during the cooking operation. In the top of the shell 1 is provided an exhaust conduit 30, connected to a suitable suction apparatus, by which the vapors are exhausted from the shell during the drying operation, which is effected by the circulation of steam intermediate the inner and outer shells, after the cooking operation has been completed.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific details shown, but that the means and construction herein disclosed comprise but one of several modes of putting the invention into effect and the invention is therefore claimed in any of its forms or modifications within the legitimate and valid scope of the appended claims.

Having thus described my invention, I claim:

1. In a steam pressure cooker and drier for offal refuse and the like, a tank, the lower portion of which is double walled, the inner wall being spaced from the outer wall to form an intermediate steam space, said double walled portion terminating at a mid height point of the tank, the inner wall of the tank being peripherally corrugated to stiffen said inner wall against external pressure and to increase the area of the heated surface in the lower portion of the tank, and a rotary agitator in the double walled portion of the tank by which the material subjected to highest temperature within the double walled portion of the tank is agitated during the treating process.

2. In a steam cooker and drier for offal refuse and the like, means for progressively treating the mass of material by subjecting the lower portion thereof to higher temperature and agitation comprising a tank, a peripherally corrugated inner shell located in the lower portion of the tank in spaced relation with the wall of the tank to form intermediate the corrugated inner shell and the wall of the tank an annular steam space to which steam is admitted for heating the lower portion of the mass to higher degree than that in the higher zones, thereby progressively cooking and drying the mass, the interior of said inner shell being subject to internal steam pressure independent of said intermediate steam space, an agitator subjecting the most highly heated portion of the mass to agitation during the treating process, the corrugations of the inner shell being adapted to increase the area of the heated surface in the lower portion of the tank, and to enable the shell to withstand predominating external or internal pressures independent of stay bolt connections with the main tank wall.

3. In a steam cooker and drier of the character described, a tank, the lower portion of which is double walled, the inner and outer walls being spaced one from the other to form an intermediate steam space terminating at a mid height point of the mass of material to be treated, whereby the upper and lower portions of the mass will be subjected to different temperatures to effect a progressive treatment of the mass, said inner wall being peripherally corrugated to increase the area of the heated surface in the lower portion of the tank, and to enable said inner wall to withstand external pressure without necessitating stay bolt connections with the outer wall.

In testimony whereof, I have hereunto set my hand this 13th day of December, A. D. 1920.

JOSEPH J. GAGE.

Witnesses:
WILLIAM A. SWANEY,
GEORGE C. HELMIG.